(12) United States Patent
França et al.

(10) Patent No.: US 12,607,449 B2
(45) Date of Patent: Apr. 21, 2026

(54) METHOD OF CALIBRATING OPTICAL COHERENCE TOMOGRAPHY APPARATUS TO MEASURE DEPTH

(71) Applicant: UNIVERSITY OF MANITOBA, Winnipeg (CA)

(72) Inventors: Rodrigo De Oliveira França, Winnipeg (CA); Sherif Abdel Hamid Shawky Sherif, Winnipeg (CA); Akeem Abiodun Azeez, Winnipeg (CA)

(73) Assignee: University of Manitoba, Winnipeg (CA)

( * ) Notice: Subject to any disclaimer, the term of this patent is extended or adjusted under 35 U.S.C. 154(b) by 52 days.

(21) Appl. No.: 18/361,170

(22) Filed: Jul. 28, 2023

(65) Prior Publication Data
US 2024/0077300 A1    Mar. 7, 2024

Related U.S. Application Data

(60) Provisional application No. 63/400,180, filed on Aug. 23, 2022.

(51) Int. Cl.
G01B 9/02055 (2022.01)
G01B 9/02091 (2022.01)
(Continued)

(52) U.S. Cl.
CPC ..... G01B 9/02072 (2013.04); G01B 9/02091 (2013.01); G01B 11/22 (2013.01);
(Continued)

(58) Field of Classification Search
CPC ............ G01B 9/02072; G01B 9/02091; G01B 11/22; A61B 5/0066; A61B 5/0088;
(Continued)

(56) References Cited

U.S. PATENT DOCUMENTS 6,396,587 B1 * 5/2002 Knupfer ............. G01B 9/02032
356/479
2008/0062429 A1 * 3/2008 Liang .................... A61B 1/043
356/497

(Continued)

FOREIGN PATENT DOCUMENTS

JP        2007037723 A  *  2/2007

*Primary Examiner* — Michael A Lyons
(74) *Attorney, Agent, or Firm* — Ryan W. Dupuis; Kyle R. Satterthwaite; Ade & Company Inc.

(57) ABSTRACT

A method of calibrating an apparatus configured to perform optical coherence tomography to measure depth of an article of a prescribed type comprises (a) using an existing measurement system configured to measure depth, measuring a sample of the article to obtain reference depth measurements; b) using the optical coherence tomography apparatus, capturing sectional images of the sample at the same positions at which the reference depth measurements were obtained; c) determining, in each sectional image, a number of pixels in a depth direction of the sample; and d) determining, using the reference depth measurements and the numbers of pixels from the sectional images, a correlation curve to associate pixels in images captured by optical coherence tomography with physical depth. Measuring the sample comprises performing plural measurements at different positions on the sample. Each measurement is in the form of a profile of the sample at a corresponding position thereon.

18 Claims, 8 Drawing Sheets

(51) Int. Cl.
    *G01B 11/22*         (2006.01)
    *G06T 7/521*         (2017.01)

(52) U.S. Cl.
    CPC .... *G06T 7/521* (2017.01); *G06T 2207/10101*
            (2013.01); *G06T 2207/30036* (2013.01)

(58) Field of Classification Search
    CPC ........... G06T 7/521; G06T 2207/10101; G06T
                            2207/30036
    See application file for complete search history.

(56)                   References Cited

U.S. PATENT DOCUMENTS

2021/0073988 A1*   3/2021   Hirose ................. A61B 3/1225
2023/0194238 A1*   6/2023   Jeong ................. G01B 9/02091
                                      356/497
2023/0194245 A1*   6/2023   Shin .................... A61B 5/0077
                                      356/497

* cited by examiner

FIG. 7A          FIG. 7B
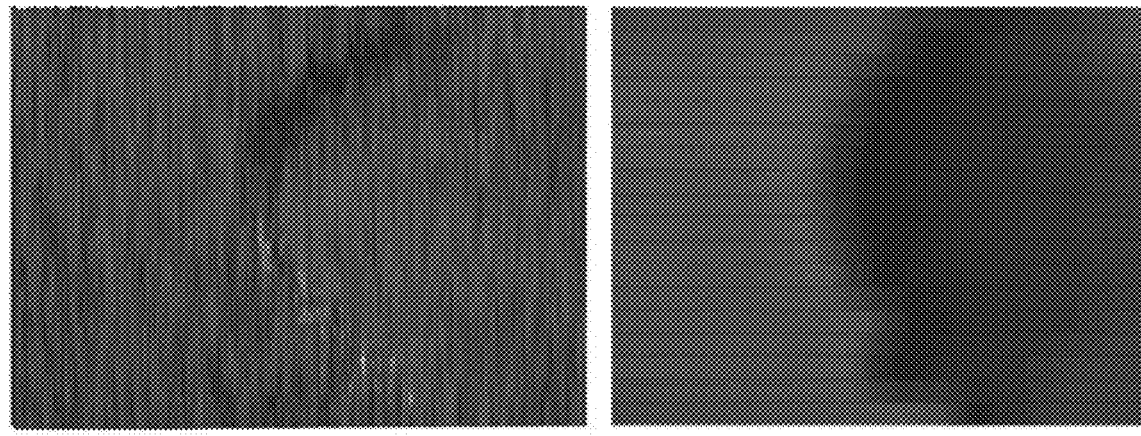
FIG. 7C          FIG. 7D
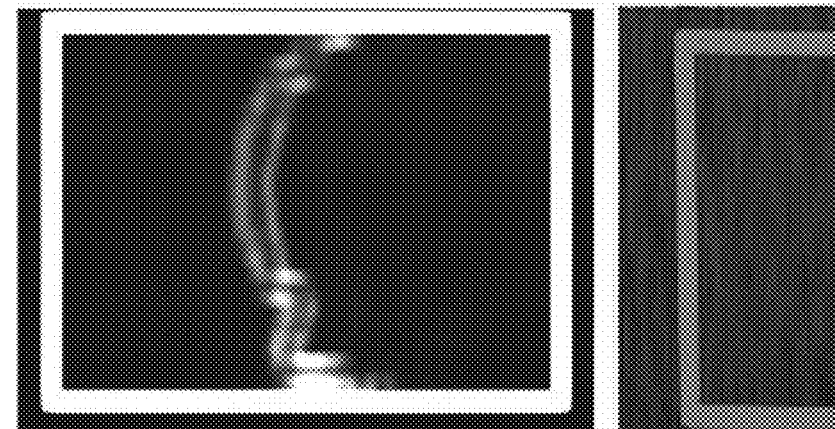
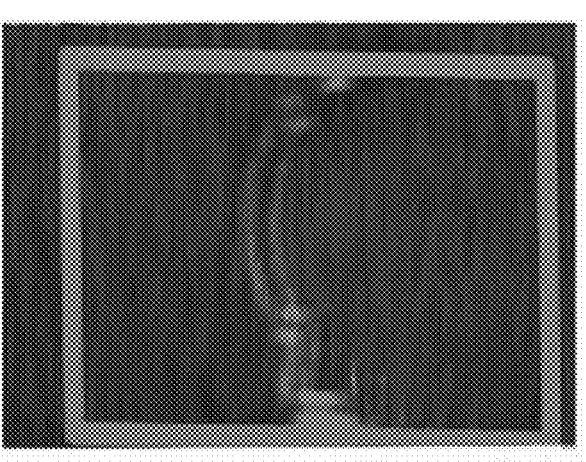

METHOD OF CALIBRATING OPTICAL COHERENCE TOMOGRAPHY APPARATUS TO MEASURE DEPTH

This application claims the benefit under 35 U.S.C. 119(e) of U.S. Provisional application Ser. No. 63/400,180 filed Aug. 23, 2022.

FIELD OF THE INVENTION

The present invention relates to a method of calibrating an apparatus configured to perform optical coherence tomography to measure depth of an article.

BACKGROUND

Tooth enamel is the hardest substance in the body. It comprises approximately ninety-six percent mineral, has a Vickers hardness average of 283 and an elastic modulus average of 1.3 GPa. These mechanical features give it an excellent resistance to wear, but the harsh oral environment makes wear inevitable despite its unique characteristics. The wear rate of a sound tooth in a fair oral environment is between 10-40 μm per year, but it can be far more significant in an environment that is exposed to temperature shock, acid attacks, bad dental hygiene, and unhealthy eating habit [1-4].

Tooth wear is an irreversible gradual loss of the dental hard tissue and can be grouped into two major categories: a) Mechanical (attrition, abrasion, and abfraction), and b) Chemical (erosion) [3]. It is desirable to investigate and quantify the progression of tooth wear because macro-wear (wear that is visible to the naked eye) can threaten the survival of individuals by severely affecting their eating rate and habit [5], and recent publications show 38% of the data from the articles published globally in the past four decades have suffered from severe tooth wear [6].

In most cases, the destroyed enamels are restored to regain their functionality by amalgam, composite, or ceramics restorative materials. Still, unfortunately, the wear rates of these materials far exceed the natural tooth [7].

Optical coherence tomography (OCT) is based on an optical interferometry system with a low coherence length broadband source. The low coherence broadband light source is split into two by a beam splitter, one is sent to a reference mirror, and the other is sent to the sample. The backscattered light from both the reference mirror and the sample interferes within the Michelson or Mach-Zehnder interferometer [8-10]. This constructive interference occurs when the optical path difference between the two lights is an integer multiple of the wavelength. This interference is then acquired by a photodiode and processed to get the image of the desired organs or tissues. OCT has better image resolutions than ultrasound, and the axial resolution of OCT is <20 μm [11]. OCT has been used extensively in the following medical fields: ophthalmology, gastrointestinal endoscopy, dermatology, laryngology, urology, gynaecology and recently, it has been an active field of research in dentistry.

OCT is an imaging technique developed by Fujimoto et al. in 1991; it has been used in many areas of medicine. It has proven to be the most clinically viable substitute for X-rays in dentistry [11-13]. However, such applications often rely on secondary length (depth) measuring applications which may be salient sources of errors in quantification.

In addition, current clinical wear detection involves more complex techniques and several steps, such as impressions of the oral cavity and cast reproduction, followed by microscopic analyses. These techniques are time-consuming, expensive, and not accurate.

SUMMARY OF THE INVENTION

According to an aspect of the invention there is provided a method of calibrating an apparatus configured to perform optical coherence tomography to measure depth of an article of a prescribed type, the method comprising the steps of:

a) using an existing measurement system configured to measure depth, measuring a sample of the article of the prescribed type to obtain reference depth measurements, wherein measuring the sample comprises performing a plurality of measurements at different positions on the sample, wherein each measurement is in the form of a profile of the sample at a corresponding one of the positions thereon;

b) using the apparatus configured to perform optical coherence tomography, capturing sectional images of the sample at the same positions at which the reference depth measurements were obtained;

c) determining, in each sectional image of the sample captured by the apparatus configured to perform optical coherence tomography, a number of pixels in a depth direction of the sample; and d) determining, using the reference depth measurements and the numbers of pixels in the depth direction in the sectional images captured by optical coherence tomography, a correlation curve to associate pixels in images captured by optical coherence tomography with physical depth.

In this manner, the apparatus configured to perform optical coherence tomography is adapted for use to measure depth, particularly for articles of the type used during calibration.

In the illustrated arrangement, the method further includes, after measuring the sample to obtain reference depth measurements, selecting, from the reference depth measurements, respective extreme values as representative measurements for the different positions, and wherein determining, in each sectional image of the sample captured by the apparatus configured to perform optical coherence tomography, a number of pixels in a depth direction of the sample comprises determining the number of pixels at a location of the sample corresponding to an extreme depth.

In one such arrangement, the extreme values in the reference depth measurements are maximum depths, and the number of pixels determined at a location of the sample corresponding to an extreme depth are the number of pixels corresponding to a maximum depth of the sample.

In the illustrated arrangement, the method further includes, before determining a correlation curve, performing image registration to verify accuracy between the reference depth measurements obtained and the sectional images of the sample captured by optical coherence tomography, wherein image registration includes forming three-dimensional models of the sample representative of the existing measurement system and optical coherence tomography, respectively, and comparing images derived from the respective three-dimensional models, wherein the three-dimensional models representative of the existing measurement system and optical coherence tomography are formed based on the reference depth measurements and the sectional images, respectively.

In one such arrangement, the method further includes repeating steps a) and b) if accuracy of the three-dimensional models of the sample representative of the existing measurement system and optical coherence tomography is below a prescribed threshold.

In one such arrangement, the prescribed threshold is 90%.

In one arrangement, when the article of the prescribed type is a tooth made substantially of a restorative material such that the tooth is homogeneous, the method further comprises, before measuring a sample of the article of the prescribed type to obtain reference depth measurements, forming the sample, including:

(i) providing a body of the restorative material;

(ii) forming a flat upwardly-facing surface on the body of restorative material; and (iii) repeatedly striking the body of the restorative material on the upwardly-facing surface thereof over a prescribed period of time to mimic tooth wear.

In one arrangement, measuring a sample of the article of the prescribed type to obtain reference depth measurements comprises performing 10 or more measurements at different positions on the sample.

In one arrangement, when the article of the prescribed type is a tooth, the existing measurement system has a resolution in the order of microns.

According to another aspect of the invention there is provided use of an apparatus configured to perform optical coherence tomography to measure depth of a homogeneous body which is calibrated according to a method comprising the steps of:

using an existing measurement system configured to measure depth, measuring a sample of the article of the prescribed type to obtain reference depth measurements, wherein measuring the sample comprises performing a plurality of measurements at different positions on the sample, wherein each measurement is in the form of a profile of the sample at a corresponding one of the positions thereon;

using the apparatus configured to perform optical coherence tomography, capturing sectional images of the sample at the same positions at which the reference depth measurements were obtained;

determining, in each sectional image of the sample captured by the apparatus configured to perform optical coherence tomography, a number of pixels in a depth direction of the sample;

determining, using the reference depth measurements and the numbers of pixels in the depth direction in the sectional images captured by optical coherence tomography, a correlation curve to associate pixels in images captured by optical coherence tomography with physical depth.

According to yet another aspect of the invention there is provided a method of measuring a dimension of an article comprising:

providing an apparatus configured to perform optical coherence tomography;

capturing, using the apparatus, an image of the article; and determining, from the image of the article, the dimension of the article based on a number of pixels in the image in a corresponding direction of measurement.

Preferably, the apparatus is calibrated according to the method of calibrating a like apparatus described above.

Preferably, determining the dimension of the article comprises converting the number of pixels in the corresponding direction of measurement to the dimension based on a correlation curve.

BRIEF DESCRIPTION OF THE DRAWINGS

The invention will be described in conjunction with the accompanying drawings in which:

FIGS. 7A through 7D respectively show (i) a top view of an OCT three-dimensional (3D) image of a sample; (ii) a top view of a SP 3D image of the sample; (iii) a contrast-enhanced SP 3D image; and (iv) a registered image of the OCT and SP images;

In the drawings like characters of reference indicate corresponding parts in the different figures.

DETAILED DESCRIPTION

Figure 1:
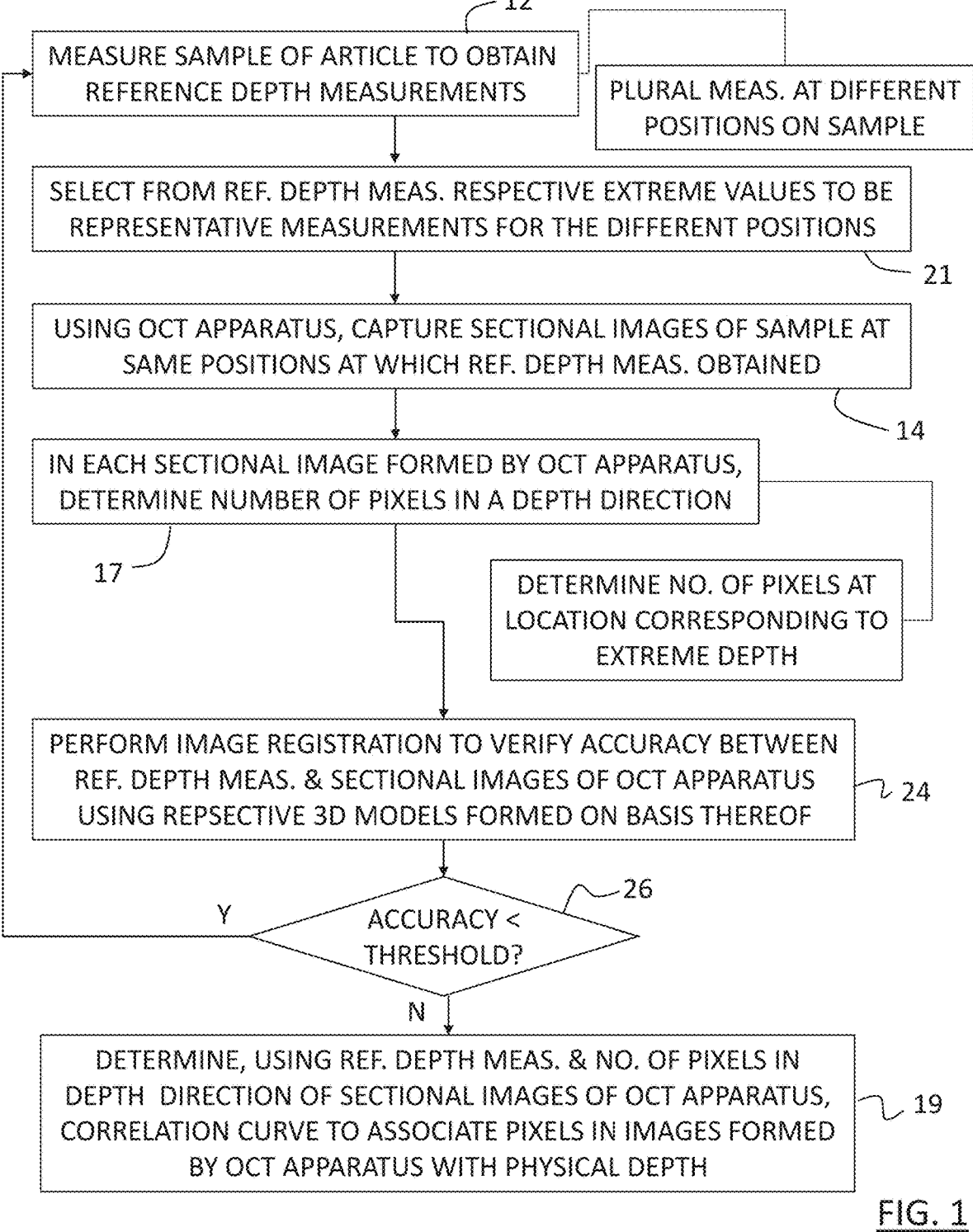
FIG. 1 is a flowchart of an arrangement of calibration method according to the present invention.
Figure 2:
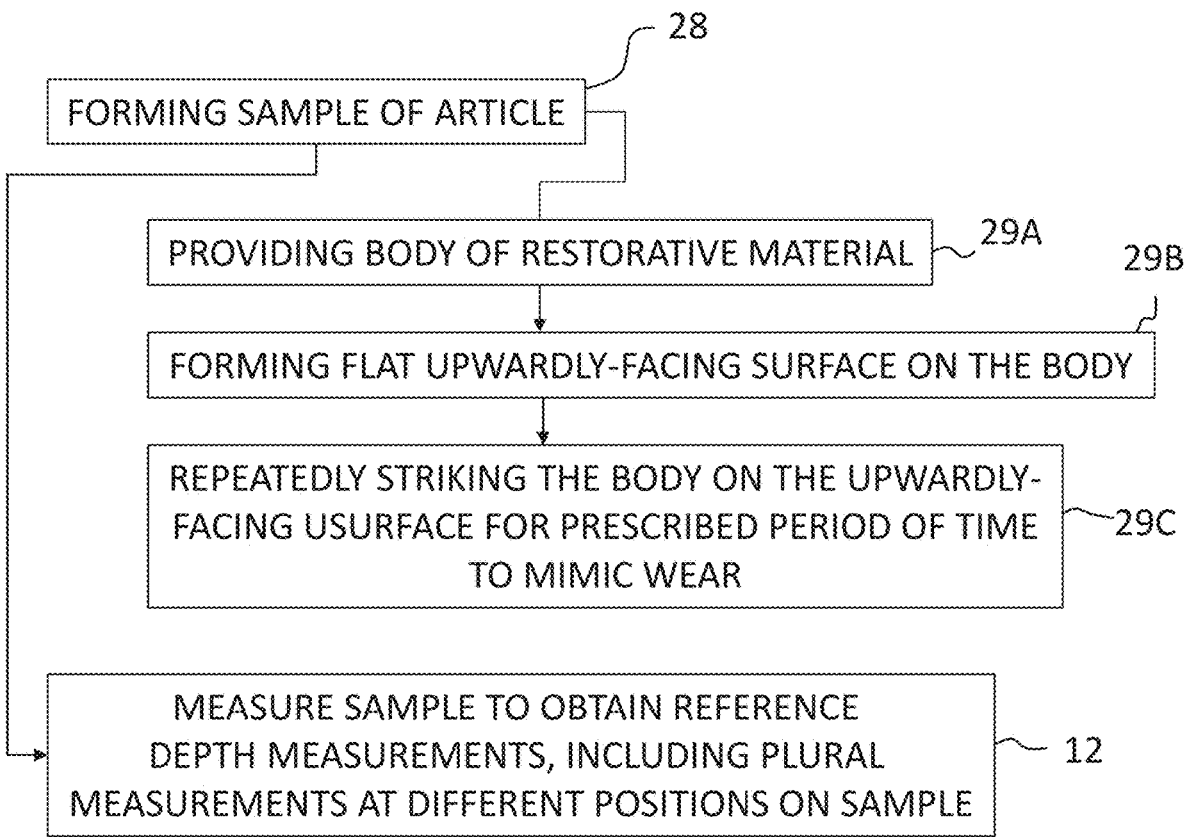
FIG. 2 is another flowchart of the arrangement of FIG. 1.
Figure 3:
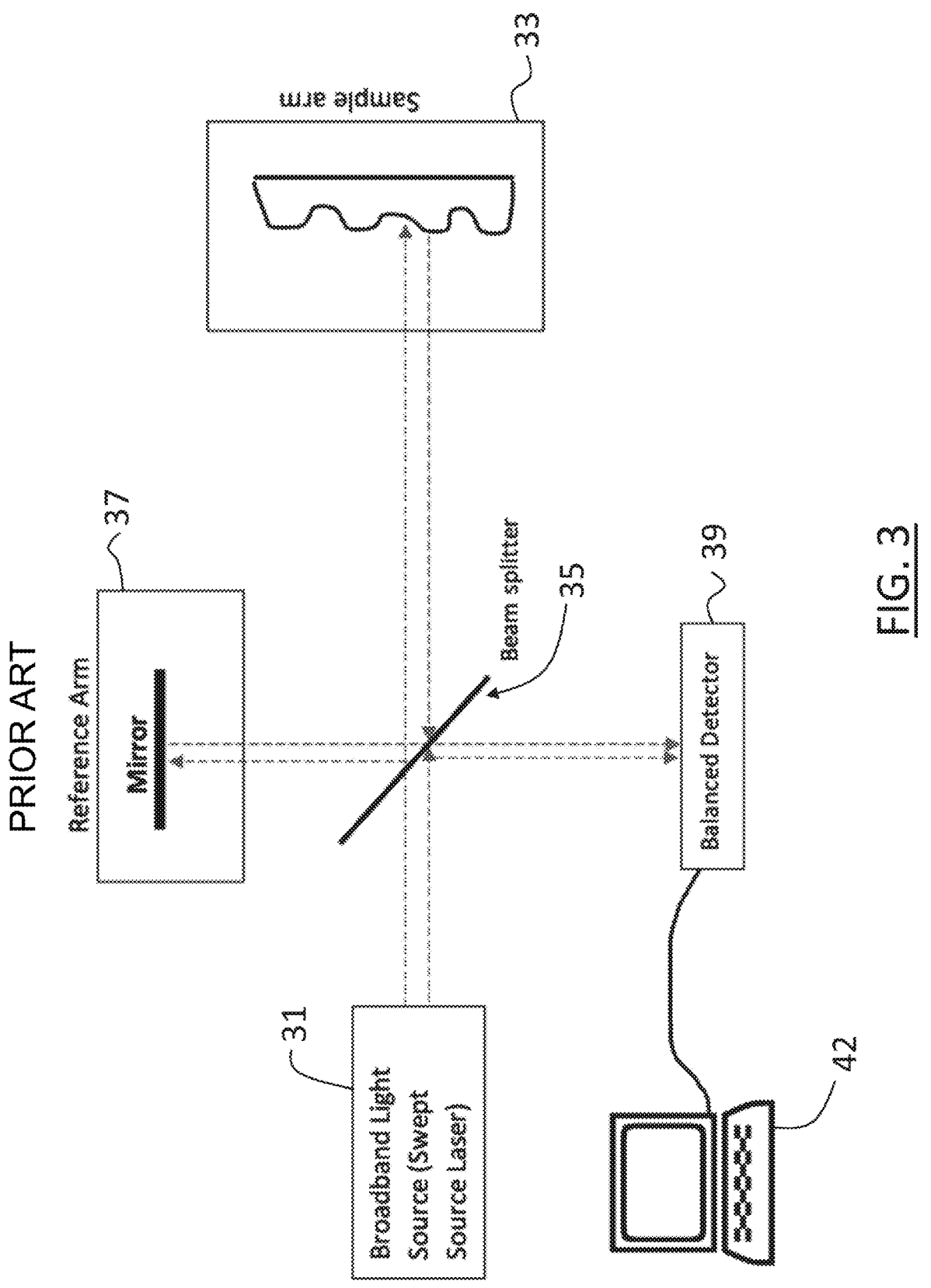
FIG. 3 is a schematic diagram of an apparatus configured to perform optical coherence tomography, which can be calibrated to perform the method of the present invention.

With reference to the accompanying figures, and in particular FIGS. 1 and 2, there is shown a method of calibrating an apparatus configured to perform optical coherence tomography (OCT), for example that shown in FIG. 3, to measure depth of an article of a prescribed type.

Generally speaking, and referring to FIG. 1, the method comprises the steps of:

a) as indicated at step 12, using an existing measurement system configured to measure depth, measuring a sample of the article of the prescribed type to obtain reference depth measurements;

b) as indicated at step 14, using the optical coherence tomography apparatus, capturing sectional images of the sample at the same positions at which the reference depth measurements were obtained;

c) as indicated at step 17, determining, in each sectional image of the sample captured by the optical coherence tomography apparatus, a number of pixels in a depth direction of the sample;

d) as indicated at step 19, determining, using the reference depth measurements and the numbers of pixels in the depth direction in the sectional images captured by optical coherence tomography, a correlation curve to associate pixels in images captured by optical coherence tomography with physical depth.

More specifically, the step of measuring the sample to obtain reference depth measurements at 12 comprises performing a plurality of measurements at different positions on the sample, preferably 10 or more measurements. Each measurement is in the form of a profile of the sample at a corresponding position thereon. Thus, for example, the measurements are a plurality of lateral profiles of the sample at a plurality of longitudinal positions thereof. As such, each profile is representative of a cross-section at a unique location of the sample.

When the article of the prescribed type is a tooth, the existing measurement system has a resolution in the order of 5 microns. A suitable example of the existing measurement system for such prescribed article types is Surface Profiler (SP).

The existing measurement system is configured to measure depth for example directly or indirectly such as by capturing data that can be processed to determine depth in an absolute manner. In other words, the existing measurement system is generally a known measurement system which is already calibrated, that is it is pre-calibrated, to measure depth.

In the illustrated arrangement, the method further includes, after measuring the sample to obtain reference depth measurements at 12, a step of selecting, from the reference depth measurements, respective extreme values as representative measurements for the different positions, as indicated at 21. As such, the step of determining the number of pixels in the depth direction of the sectional images of the sample comprises determining the number of pixels at a location of the sample corresponding to an extreme depth. For example, the location of the extreme depth is determined by manual visual review of each sectional image by a user performing the calibration.

In the illustrated arrangement, the extreme values in the reference depth measurements are maximum depths, and accordingly the number of pixels determined at a location of the sample corresponding to an extreme depth are the number of pixels corresponding to a maximum depth of the sample. Generally speaking, identifying extreme values for correspondence between the two forms of measurement provides distinguishable values for comparison and correspondence.

In the illustrated arrangement, the method further includes, before determining a correlation curve at 19, a step of performing image registration to verify accuracy between the reference depth measurements obtained and the sectional images of the sample captured by optical coherence tomography, as indicated at 24. Image registration includes forming three-dimensional models of the sample representative of the existing measurement system and optical coherence tomography, respectively, and comparing images derived from the respective three-dimensional models. The representative three-dimensional models are formed based on the reference depth measurements and the sectional images, respectively. Basically, the step of image registration is intended to confirm correspondence of locations of the reference depth measurements and the sectional images relative to the sample.

In the illustrated arrangement, the method further includes repeating steps a) and b) if accuracy of the three-dimensional models of the sample representative of the existing measurement system and optical coherence tomography is below a prescribed threshold, which preferably is 90%. This may be achieved by providing a step of comparing the determined accuracy of image registration to the prescribed threshold, as at 26, and (i) if the determined accuracy is less than the threshold, then repeating the step of measuring the sample using the existing measurement system at 12, which is follow by step 14 of capturing sectional OCT images at the positions corresponding to the reference depth measurements; or (ii) if the determined accuracy is greater than or equal to the prescribed threshold, then performing the step of determining the correlation curve at 19.

With reference to FIG. 2, when the article of the prescribed type is a tooth made substantially of a restorative material such that the tooth is homogeneous, the method further comprises, before obtain reference depth measurements, a step of forming the sample as indicated at 28. This generally includes the steps of:

(i) providing a body of the restorative material, as indicated at 29A;

(ii) forming a flat upwardly-facing surface on the body of restorative material, as indicated at 29B; and (iii) repeatedly striking the body of the restorative material on the upwardly-facing surface thereof over a prescribed period of time to mimic tooth wear, as indicated at 29C.

FIG. 3 shows a conventional optical coherence tomography apparatus comprising a light source 31 configured to generate a laser beam to be swept from an initial frequency to a final frequency; a sample arm 33 arranged in downstream relation to the swept laser, along a linear path, and configured to receive the sample to be imaged; a beam splitter 35 arranged intermediate the light source 31 and the sample arm 33 and configured to split an incident laser beam directed from the light source 31 to the sample arm 33 in generally opposite directions and to split a reflected laser beam emitted from the sample at the arm 33 in coincident directions as the split incident beam. The apparatus further comprises a reference arm 37 carrying a mirror lying along a path defined by one of the opposite directions in which the beams are split, and a detector 39 in opposite relation to the reference arm 37 and lying along a path defined by the other one of the opposite directions in which the beams are split. The detector 39 is operatively communicated with a computing device 42 to process an output of the detector 39.

In use, the OCT apparatus calibrated according to the method disclosed herein is configured to determine depth, or more generally physical dimension, from a captured image of an article based on a number of a pixels in a corresponding direction of measurement, that is a direction corresponding to depth of the article or to the desired dimension to be measured. A number or quantity of pixels determined, for example by counting, in the corresponding direction of measurement is then convertible to a physical depth.

Figure 4:
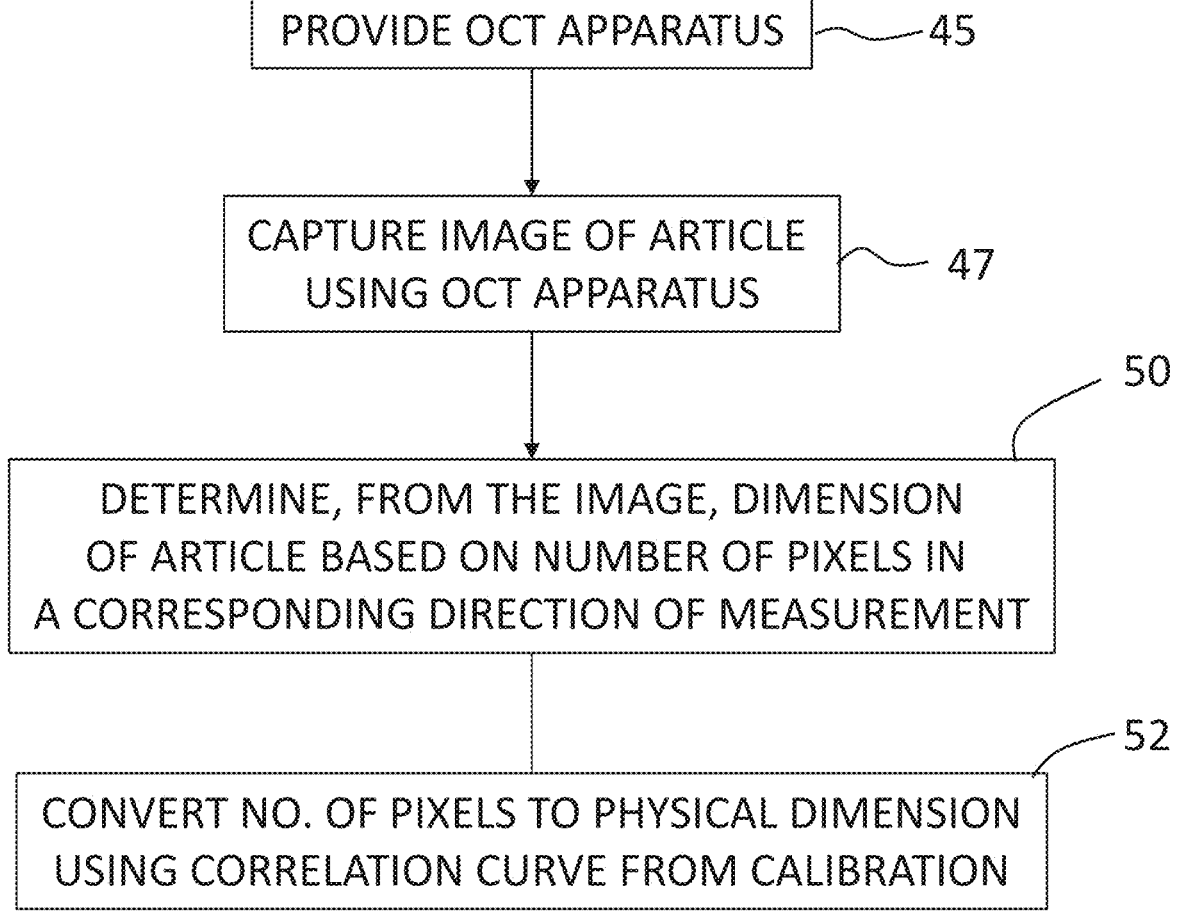
FIG. 4 is a flowchart of an arrangement of method according to another aspect of the present invention.

As such, with reference to FIG. 4, there is also disclosed herein a method of measuring a dimension of an article, which comprises the steps of:

providing an apparatus configured to perform optical coherence tomography, as indicated at 45;

as indicated at step 47, capturing, using this apparatus, an image of the article; and as indicated at step 50, determining, from the image of the article, the dimension based on a number of pixels in the image in a corresponding direction of measurement.

The step of determining the dimension comprises converting the number of pixels to the physical dimension using a correlation curve derived from calibration, as indicated at 52.

Thus, an optical coherence tomography apparatus can be adapted by the afore-described method to measure depth, particularly for articles of the type used in calibration.

In other words, the OCT apparatus is configurable according to the calibration method of this disclosure to determine depth of an imaged article directly from the captured image based on pixels therein, without implementing additional software or applications to process the captured image in order to derive depth.

Also, in this manner, the OCT apparatus can be configured to measure depth of a homogeneous body.

As described hereinbefore, when the article of the pre-scribed type is a tooth, the present invention relates to a method for calibrating an optical coherence tomography apparatus, which method may comprise:

1. Preparing amalgam, which is an example of a restor-ative material for teeth. Typically, this includes i) mounting the amalgam on an acrylic block; ii) flatten-ing and/or smoothing the amalgam to form a surface representative of a pulverizing surface of the tooth; and iii) emulating wear on the smooth surface of the amalgam using a wear emulation machine. The surface of the amalgam may be flattened and smoothened using Silicon Carbide grinding papers and smoothing clothes. The artificial wear may be emulated by performing 20,000-40,000 cycles under 50-60 N load for at least 24 hrs to form conspicuous wear suited for calibration.

2. Identifying a standard or known depth measuring technique with a resolution of microns to millimetres. This measuring technique is configured to provide or form data of a line profile over the wear emulation on the amalgam. Get the maximum depth from each of the profiles.

3. Use OCT to produce sectional images of the wear emulation. The sites and numbers of the sectional images are to correspond with the profiles produced by the standard measuring technique. Count the number of pixels corresponding to the maximum depth from each sectional image.

4. Using measurement data from the known measurement technique and measurement data from OCT, construct respective three-dimensional models of the amalgam representative of the two measurement methods/tech-niques.

5. Compare, by superimposing, images generated from the two 3D models at corresponding positions of the 3D models to ascertain that they are from the same location on the amalgam. This process is known as image registration—the constructed 3D images derived from the known measurement technique and OCT. If steps 1-3 are well performed, the image registration quality will be excellent.

6. Determine a correlation curve to associate pixels in the images captured using OCT with the physical distances (maximum depths) from the profile data of the standard measuring technique. The data from the standard mea-suring technique ($\mu$m) is plotted against the OCT data (pixels). The correlation curve should be zeroed-mean-ing no intercept—as either method should yield zero when there is no depth. When the standard measuring technique's resolution is in micrometres, the correla-tion curve slope unit is $\mu$m per pixel.

Note: With an increase in the number of cycles and emulation time of the wear machine, the above procedure could be applied to a test tooth or any other restorative materials.

The calibration method described above typically will be performed by a manufacturer prior to sale of OCT units to end-users. Afterwards, the value of the calibration slope is embedded in software that controls the OCT imaging appa-ratus. Without it, end-users cannot interpret the images generated by the OCT from restorative materials like amal-gam because of the homogeneity of the materials and lack of underneath reference points.

Wear of a tooth essentially consisting of restorative mate-rial may be determined by measuring a difference in depth between superposed OCT images of a common tooth taken at different points in time.

In this disclosure, the capability and accuracy of OCT in measuring wear depth in dental restorative materials is evaluated and compared to a micro-Surface Profiler (SP) without the assistance of secondary measuring software. The null hypotheses are stated thus: 1. There is no difference between OCT and SP results 2. The dental restorative materials have the same wear rates.

Study Design

Ninety samples prepared from three different restorative materials (Amalgam, Low-viscosity Composite resin, and High-viscosity Composite resin) (as shown in Tables 1A and 1 B) were subjected to wear emulation from a custom-made wear simulator for 24 hours. The experiment was divided into two parts. The first part of the experiment was to check the capability of the OCT to quantify wear depths in the restorative materials. Therefore, the wear depths in the amalgam samples were evaluated by both OCT and a micro-Surface Profiler (SP). The OCT was calibrated by the wear depths results from the SP, and its capability to measure the wear depth was compared to the SP method. The second part of the experiment was to compare the wear rates in the three different restorative materials by using only OCT.

Preparation of the Samples of the Restorative Materials

Ninety restorative samples were prepared by mounting the restorative materials on the acrylic polishing blocks. The acrylic blocks were formed by mixing a liquid monomer and powder polymer properly in correct proportion and allowing them to undergo self-curing polymerization for thirty min-utes until they became stiff. The average diameter of the samples was 10 mm. The surface was flattened using #120, #200, #600, #1200, and #1500 grit silicon carbide (SiC) paper in succession on an automated grinding and polishing machine under running deionized water.

Emulation of Wear on Samples

The custom-made wear machine used in this disclosure is a variation of the two-body contact wear model; it had an AC motor that operated at 30 revolutions per minute. The motor drove a metal rod to which an offset CAM was attached; six identical steel indenters were attached to a metal bar directly above the metal rod. These metal bars are capable of independent vertical movements. The indenters were designed to have a vertical movement of 10 mm and come in contact with the surface of the stationary samples at each revolution. A load of 5 kg was attached to each bar carrying the steel indenters during the whole experiment.

Evaluation of Wear Depth with Surface Profiler

Figure 5:
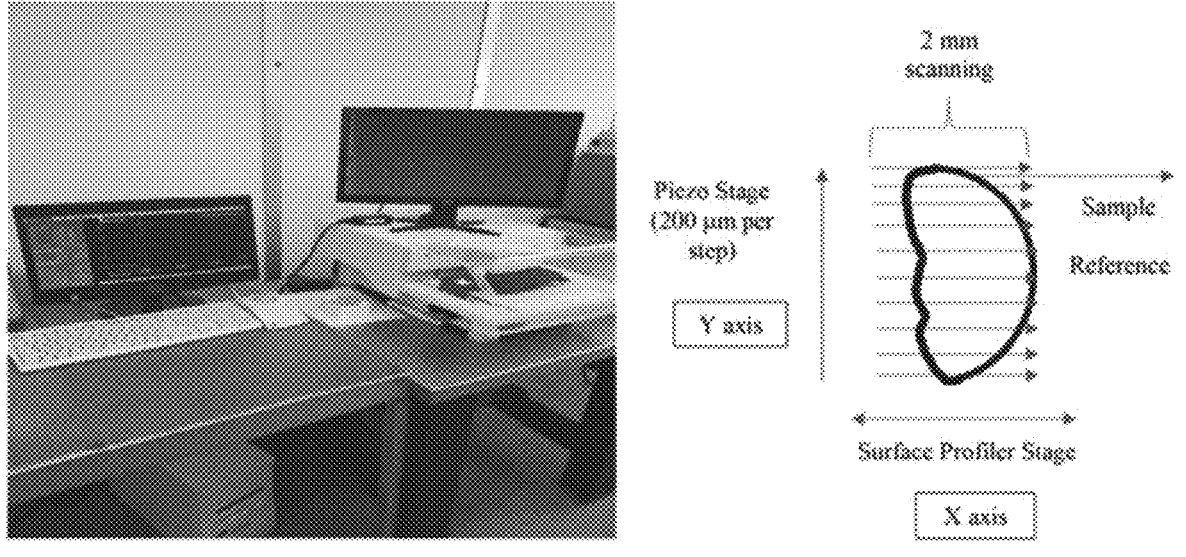
FIG. 5 shows a surface profiler (SP) apparatus and a top view schematic diagram of a stage setup of the SP.

An Alpha-step 500 profilometer (Tencor) scanner with a 5 $\mu$m radius tip and stylus load of 8.1 mg was used as a standard method in this disclosure. The stylus was loaded onto the surface of the samples, which moved at a constant speed of 3 $\mu$m/sec to obtain height variation (depth profile). A linear piezo stage (Newport Conex-AG) was attached to the Alpha-step stage, and this was necessary to get a more precise stage movement. Using the zoom function on the SP, the scanning was done at the beginning of the indentation in a step of 200 $\mu$m (FIG. 5). The maximum scanning range for this method is 2 mm. As the scanning progresses stepwise, the scanning pin will not reach the reference part of the sample (right side of indentation), so there is a need to shift the sample to the left using the profiler stage (X-axis). This distorted the surface profiler's reconstruction image.

The maximum depth from each scan was recorded; average depth was calculated from the total scans (10) for each sample.

Evaluation of Wear Depth with OCT

The cross-sectional images (b-scan) of the samples were obtained using a Swept Source OCT with a centre wavelength of $1310\pm30$ nm and a scanning rate of $100\pm0.1$ kHz. The coherence length of the OCT system was 20.4 mm. The maximum lateral scan of the device was 14 mm×14 mm but was set to 5 mm×5 mm with the aid of the system's galvo mirrors.

A piezo stage (Newport) and Opti-TekScope (digital USB microscope camera) with zoom function were also attached to the stage of the OCT to replicate the scanning procedure done on the SP. Aside from the operational differences between the two methods, another distinction was the stage set-up; the scanning range for OCT was longer than the SP.

Figure 6:
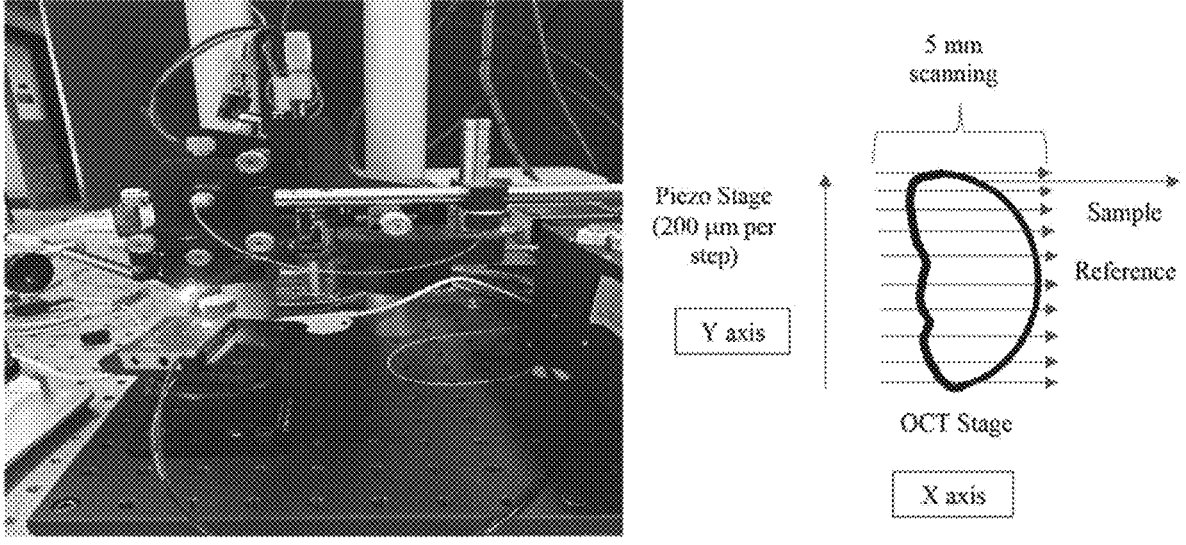
FIG. 6 shows an optical coherence tomography (OCT) setup/apparatus and a top view schematic diagram of a stage setup of the OCT.

The first b-scan was taken at the beginning of the indentation in the X-axis direction, and successive b-scans were obtained by moving the piezo stage in the Y-direction at a step of 200 μm (FIG. 6). Ten b-scans were obtained per sample.

Image Registration of the Reconstructed 3D Images for the Two Depth Measuring Methods To successfully evaluate the wear depth with OCT, there is a preliminary or initial step of calibrating the equipment. To establish that the indentation spot measured using the SP was the exact spot evaluated with the OCT, the image registration technique was used to register the two reconstructed images together. The OCT 3D image was the fixed image, while the moving image was the surface profiler 3D image (FIGS. 7A-7D). Affine linear transform was used on the moving image, and the quality of the registration was evaluated using Mattes Mutual Information.

Figures 8A, 8B:
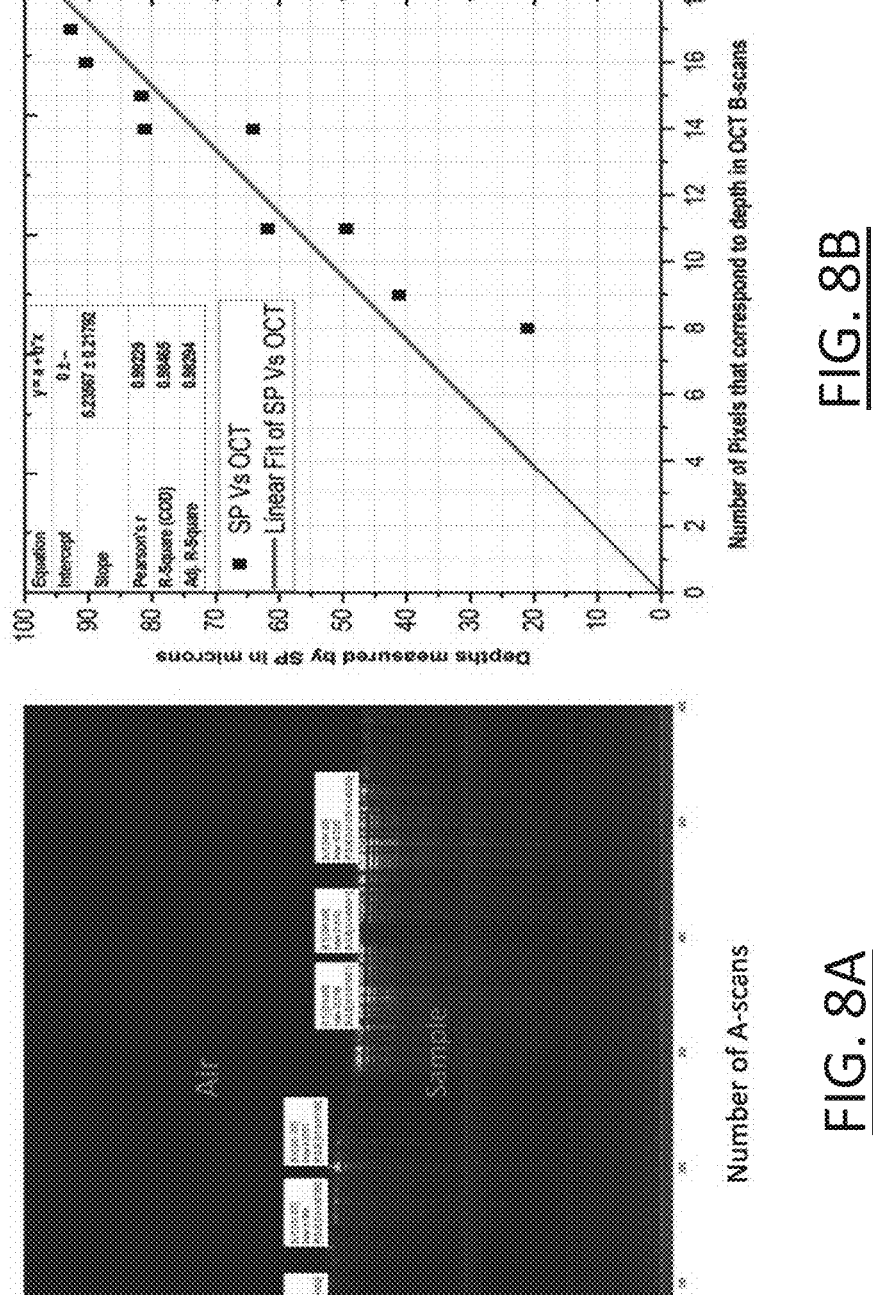
FIG. 8A is a graph showing the number of pixels that correspond to depth in the OCT b-scan, in this case 21 (the difference between 228 and 207)
FIG. 8B is a calibration curve for OCT.

After it was established that the two reconstructed images were for the same spot on the sample, the number of pixels that correspond to the wear (airgap) was calculated from the OCT b-scans as shown in FIG. 8A. The OCT calibration was done by plotting the values of maximum depth from each scan from the SP method against the corresponding pixel values from the OCT method. The regression line was forced to pass through the origin because it is expected that when the SP records an approximate zero-depth, the OCT pixel value should also be zero. The slope of the regression line was $5.24\pm0.22$ micron/pixel (FIG. 8B).

Statistical Analysis of the Results

For the first part of the experiment, the correlation and agreement between the two methods of measurement were evaluated using the intra-class correlation coefficient (ICC), the significance of the difference between the methods means, and Bland-Altman plots. In contrast, for the second part, the average wear depths from the three different restorative materials were analyzed with a one-way analysis of variance (one-way ANOVA) with materials as a factor. Tukey's post hoc tests were used to determine the statistically significant differences between and within the mean wears in the different restorative materials.

All the analyses were done at a 5% significance level and were done with Origin Pro, 2021 (Origin Lab Corporation, Northampton, MA, USA) and SPSS (IBM SPSS Statistics, USA, Version 28.0.0 (190)).

Results—Comparison of Wear Depth Measurement Methods

The ICC estimate and its confidence interval were calculated using SPSS with the following parameters: two-way mixed effects, k=2, and consistency. The result shows excellent reliability between the two methods of measurement (Table 2A).

Using a Two-Sample t-test to evaluate the significance of the difference between the means, the mean of wear depth measurements by SP (69.81 μm) did not significantly differ from the mean of OCT wear depth measurements (63.77 μm) (Tables 2B and 2C).

Figures 9A, 9B:
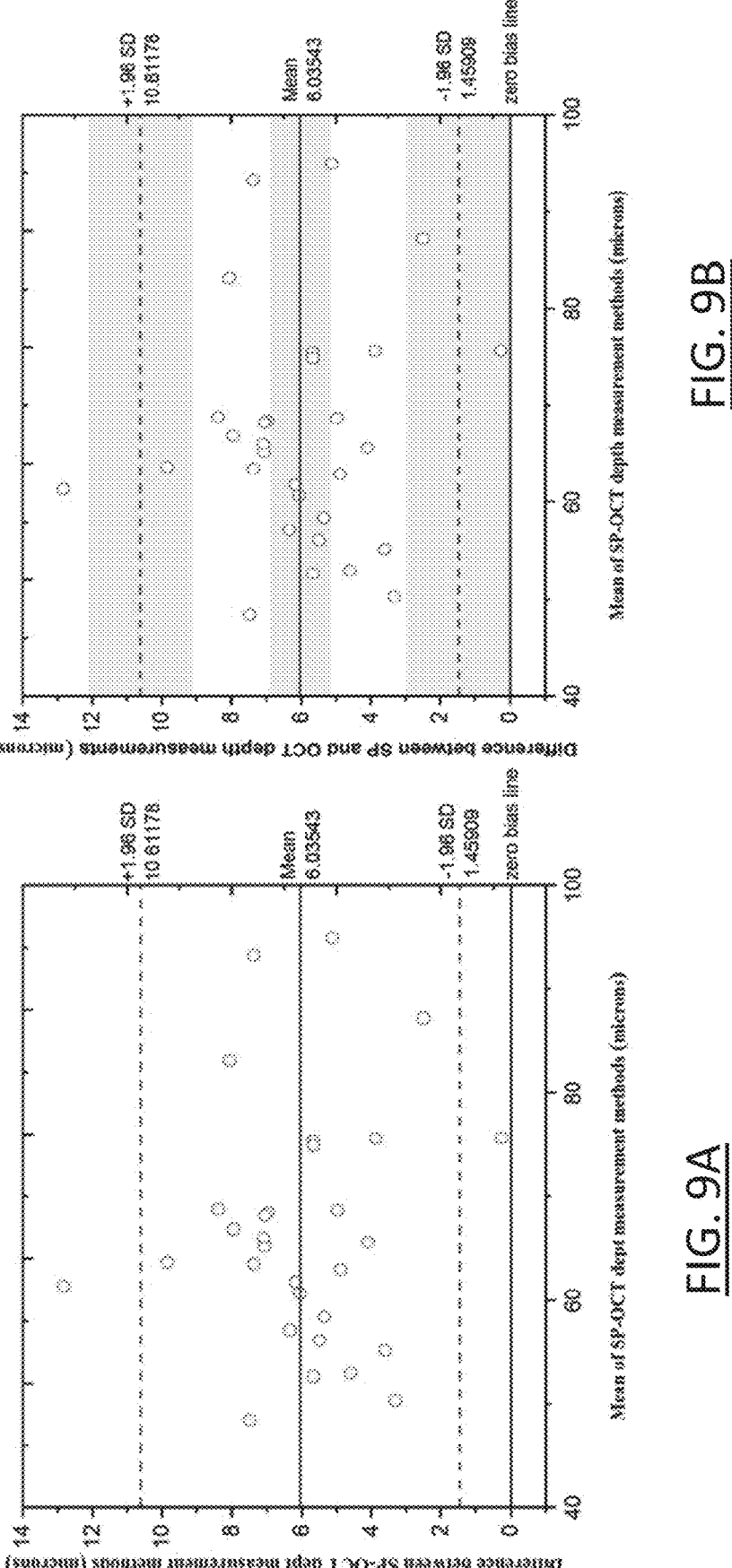
FIGS. 9A and 9B are graphs showing (i) Bland-Altman plot for SP-OCT measurement methods; and (ii) the plot as in FIG. 9A, but with representation of CI limits for mean and agreement limits (shaded areas).

The degree of agreement between the two methods was analyzed with the Bland-Altman plot [13] (FIGS. 9A and 9B).

Comparison of Wear Depths in the Three Different Restorative Materials

The results from the second part of the experiment were analyzed with one-way ANOVA and Tukey's post hoc tests. The ANOVA ($F_{(2,87)}=131.28$, $p=<0.001$) results showed that there was a statistically significant difference between the average wear rates of the three restorative materials. Further analysis with Tukey's post hoc tests (Tukey HSD) revealed that the average wear rates of amalgam ($63.77\pm11.94$, $p=<0.001$) were statistically different from the composite resin materials. On the other hand, there was no statistical difference between the average wear rates of the two composite resin materials ($p=0.874$).

Discussion of Results

Researchers have deployed OCT to investigate different problems (in-vitro and in-vivo) in dentistry, including periodontal disease, dental restoration, dental caries and tooth crack and wear.

In this disclosure, the capability of OCT to measure wear in a dental restorative material (Amalgam) was assessed by calibrating the OCT with the standard method. SP was chosen as the gold standard, that is the preferred reference, because the depth profile of the samples was of interest only and not the subsurface profile. This is in contrast with previous works by researchers who compared the capability of OCT to several other measuring methods, like p-CT, confocal laser scanning microscopy (CLSM), etc. Dentin-Enamel Junction (DEJ) was used as a point of reference in their works because there was no other mechanism to quantify the wear besides relying on measuring apps like screen ruler, ImageJ, PixelStick etc., so they worked with human teeth; DEJ would serve as an excellent reference point for enamel thickness measurements [15-18].

In addition, these measuring apps could be the insidious sources of errors for the quantification of wear or enamel thickness, for example, in the study done by Algarni et al. on the agreement between three different methods (polarization-sensitive OCT, μ-CT and histology) for the measurements of enamel thickness their result showed that the OCT measurements were significantly higher on the average than the μ-CT by 0.064 mm and were off by 0.088 mm when compared with histology measurements [15].

Without the use of any distance (depth) measuring apps, wear depth was quantified by image registration and calibration techniques. In the results, the Bland-Altman plot (FIG. 9A) showed that the limit of agreement was from 1.46 to 10.62 µm and the OCT measurement was just off the zero-bias line by 6.04 µm. The precision of OCT in evaluating dental wear against the SP was investigated by the 95% confidence interval around the mean difference (FIG. 9B).

Although there was an improvement in the accuracy and sensitivity of the OCT measurements of this disclosure when compared to the Algarni et al., the results of this disclosure show that the line of zero bias is not in the region of the Confidence Interval (CI) of the mean, and this indicates that there is still a significant systematic difference between the two measuring methods [15, 19].

In addition, the results of this disclosure show that there is no significant difference between the means of the two methods (Table 2B), which contrasted with what was reported by Algarni et al. [15] when Co-Polarization OCT (CP-OCT) was compared with µ-CT. The results revealed OCT might evaluate the depth profile like an SP, owing to the excellent correlation and agreement (ICC=0.99) between the two measuring methods. This result corroborates previous work by Alghilan et al. [16], in which they used CP-OCT and µ-CT to monitor the wear progression of natural human enamel slabs; for the enamel thickness measurement, both methods showed excellent agreement on natural (ICC=0.98) and worn surfaces (ICC=0.98).

In the second part of this disclosure, OCT was used to quantify the wear rates in the three restorative materials (Amalgam, LV_composite and HV_composite) since these are the most common restorative materials for fixing multi-surface restorations in posterior teeth [20]. Although there is a decline in the use of amalgam, a query on an extensive payer database showed that 14% of direct restorations placed in 11.8 million patients were filed with it [22], indicating that some patients still prefer it. However, composite resin restorations for direct restorations are still much in vogue due to their excellent esthetics and micromechanical bonding to the teeth.

Our results showed that the wear rate in amalgam is approximately three times higher than the composite resins; one of the reasons for this is that recent composite resin restorative materials have nano-size materials as fillers with great spread throughout the resin matrix. This combination makes composite resin restorations resilient against mechanical wear, especially in vitro experiments, but it is a different ball game when it comes to in vivo applications as tooth wear is a combination of several factors and most times, it is difficult to pinpoint a dominant cause [22]. However, amalgam restorations have better longevities than composite resins, especially for the posterior restorations, because most composite resin failures usually start at the bounding interface. Our results also showed that LV_composite resin has slightly higher mean wear than HV_composite, and there was no statistical difference between the two groups. This result tallies with what was presented in the manufacturer's scientific manual because LV_composite has a lower filler weight percent than HV_composite [23].

The results in this disclosure further corroborate that OCT is an excellent imaging system and could be used in dentistry as an imaging device. For example, Otis et al. carried out the first in vivo application in which OCT was used to image both the hard and soft dental tissues at a high resolution. Their results showed that the resolution of the OCT system was satisfactory to observe or view periodontal tissue contour, connective tissue attachment, and sulcular depth [9].

Although it was shown that OCT is a viable option for dental imaging devices, according to researchers [11, 8], the following challenges remain:

1. Limited availability of the commercial OCT due to the high cost of parts; hence, there are very few manufacturers of commercial OCT.
2. Most OCT image analysis software and algorithms are still in the development stage and not commercially available.
3. The present scanning range is limited, that is in the order of millimetres; therefore, several images are needed to scan a whole lesion.
4. Different samples use different ranges of wavelengths; the buccal cavity, for example, has both the hard and soft tissues. A wavelength of 1550 nm is excellent for hard tissue imaging but will produce a poor image of the gingiva because the soft tissue will absorb it.

There are several benefits of using OCT to detect dental wear. The main one would be the ability of the dental practitioner to track the wear of dental fillings and predict the risk of failure. Also, this new method of wear quantification would be much easier, faster, and more accurate than the actual impression/casting processes.

In conclusion, SP measuring method cannot be used clinically, but it is accurate in estimating the surface profile of materials; it is used as a standard method against the OCT in this disclosure. The presented results have shown that OCT can be clinically used in dentistry to measure tooth wear without relying on any length (depth) measuring applications. In addition, it will be appreciated that the comparison results are from in vitro experiments and may not be directly translated into, that is they may not accurately represent, in vivo applications.

As described hereinbefore, an object of this disclosure is to quantify and compare the wear rates in amalgam, composite low-viscosity, and high-viscosity using Optical Coherence Tomography (OCT).

The investigation in this disclosure had two parts: (1) Thirty samples prepared from amalgam were submitted to wear emulation by a custom-made wear machine for 24 hrs; the wear depths were then evaluated with OCT and a-standard method-Surface Profiler (SP). The agreement between the two methods was investigated using intra-class correlation coefficients (ICC), Bland-Altman plots, and the difference between means; (2) Two more dental restorative materials (composite low-viscosity and composite high-viscosity) were prepared using the same procedure as amalgam, and their wear rates were measured by OCT only. Their results were analyzed by ANOVA and Tukey's post hoc test.

Findings from the first part of the investigation revealed that a pixel from wear depth measurements by OCT is equivalent to 5.24 □0.22 µm; depth measurements from the two methods (SP & OCT) were in excellent agreement (ICC=0.99). However, Bland-Altman plots showed that there was a significant systematic difference of 6.04 µm between the two measurements obtained by these two methods. In addition, the difference between the means of the two measurements was not significant (p-value=0.053). In the second part, the ANOVA analysis of wear depth measurements results for the three different restorative materials showed that the wear depth rates were statistically different from one another (p-value=<0.001), and Tukey's post hoc test revealed that the mean wear rate in the amalgam was statistically different from the rest.

In conclusion, OCT could be used clinically to quantify the depth profiles in dental restorative materials without relying on any length (depth) measuring applications.

The scope of the claims should not be limited by the preferred embodiments set forth in the examples but should be given the broadest interpretation consistent with the specification as a whole.

REFERENCES

[1] Sajewicz E. On evaluation of wear resistance of tooth enamel and dental materials. Wear 2006; 260:1256-61. https://doi.org/10.1016/j.wear.2005.08.010.

[2] Kim S K, Park S W, Lee H S, Lee E S, de Josselin de Jong E, Kim B II. Evaluation of tooth wear by estimating enamel thickness with quantitative light-induced fluorescence technology. Photodiagnosis Photodyn Ther 2019; 25:319-24. https://doi.org/10.1016/j.pdpdt.2019.01.016.

[3] Shellis R P, Addy M. The interactions between attrition, abrasion and erosion in tooth wear. Monogr Oral Sci 2014; 25:32-45. https://doi.org/10.1159/000359936.

[4] Fung A, Brearley Messer L. Tooth wear and associated risk factors in a sample of Australian primary school children. Aust Dent J 2013; 58:235-45.

[5] Lucas P W, Omar R. Damaged! A new overview of dental wear. Arch Oral Biol 2012; 57:211-3. https://doi.org/10.1016/j.archoralbio.2011.11.001.

[6] Azeez A A, Sherif S, Franga R. Statistical Estimation of wear in permanent teeth: A systematic review. Dent Rev 2021:100001. https://doi.org/10.1016/J.DENTRE.2021.100001.

[7] Söderholm KJM, Lambrechts P, Sarrett D, Abe Y, Yang M C K, Labella R, et al. Clinical wear performance of eight experimental dental composites over three years determined by two measuring methods. Eur J Oral Sci 2001; 109:273-81. https://doi.org/10.1034/j.1600-0722.2001.00064.x.

[8] R. A Katkar, S. A Tadinada B. A. Optical coherence tomography. Adv Exp Med Biol 2018; 1085:11-3. https://doi.org/10.1007/978-3-319-95046-4_3.

[9] Otis L L, Everett M J, Sathyam U S, Colston B W. Optical Coherence Tomography: a New Imaging. J Am Dent Assoc 2000; 131:511-4. https://doi.org/10.14219/jada.archive.2000.0210.

[10] Popescu D P, Choo-Smith L P in., Flueraru C, Mao Y, Chang S, Disano J, et al. Optical coherence tomography: Fundamental principles, instrumental designs and biomedical applications. Biophys Rev 2011; 3:155-69. https://doi.org/10.1007/s12551-011-0054-7.

[11] Hsieh Y S, Ho Y C, Lee S Y, Chuang C C, Tsai J C, Lin K F, et al. Dental optical coherence tomography. Sensors (Basel) 2013; 13:8928-49. https://doi.org/10.3390/s130708928.

[12] Wolfgang Drexler J G F. Optical Coherence Tomography. vol. 29. 2008.

[13] Wilder-Smith P, Otis L, Zhang J, Chen Z. Dental OCT. In: Drexler W, Fujimoto J G, editors. Opt. Coherence Tomogr. Technol. Appl., Cham: Springer International Publishing; 2015, p. 2209-44. https://doi.org/10.1007/978-3-319-06419-276.

[14] Bland J M, Altman D G. Measuring agreement in method comparison studies. Stat Methods Med Res 1999; 8:135-60. https://doi.org/10.1177/096228029900800204.

[15] Algarni A, Kang H, Fried D, Eckert G J, Hara A T. Enamel Thickness Determination by Optical Coherence Tomography: In vitro Validation. Caries Res 2016; 50:400-6. https://doi.org/10.1159/000446779.

[16] Alghilan M A, Lippert F, Platt J A, Eckert G J, Gonzilez-Cabezas C, Fried D, et al. In vitro longitudinal evaluation of enamel wear by cross-polarization optical coherence tomography. Dent Mater 2019; 35:1464-70. https://doi.org/10.1016/j.dental.2019.07.018.

[17] Marcauteanu Adrian Bradu Cosmin Sinescu Florin Ionel Topala Meda Lavinia Negrutiu Adrian Gh Podoleanu C. Quantitative evaluation of dental abfraction and attrition using a swept-source optical coherence tomography system n.d. https://doi.org/10.1117/1.

[18] Alghilan M A, Lippert F, Platt J A, Eckert G J, Gonzilez-Cabezas C, Fried D, et al. Impact of surface micromorphology and demineralization severity on enamel loss measurements by cross-polarization optical coherence tomography. J Dent 2019; 81:52-8. https://doi.org/10.1016/j.jdent.2018.12.009.

[19] Bland U, Giavarina D. Lessons in biostatistics. Past, Present Futur Stat Sci 2014; 25:359-72. https://doi.org/10.1201/b16720-37.

[20] Naghipur S, Pesun I, Nowakowski A, Kim A. Twelve-year survival of 2-surface composite resin and amalgam premolar restorations placed by dental students. J Prosthet Dent 2016; 116:336-9. https://doi.org/10.1016/j.prosdent.2016.02.005.

[21] Donovan T E, Marzola R, Murphy K R, Cagna D R, Eichmiller F, McKee J R, et al. Annual review of selected scientific literature: A report of the Committee on Scientific Investigation of the American Academy of Restorative Dentistry. J Prosthet Dent 2018; 120:816-78. https://doi.org/10.1016/j.prosdent.2018.09.010.

[22] Bartlett D, O'Toole S. Tooth Wear: Best Evidence Consensus Statement. J Prosthodont 2021; 30:20-5. https://doi.org/10.1111/jopr.13312.

[23] Pfefferkorn F. Scientific Manual TPH Spectra ST Universal Composite Restorative n.d.

Tables

TABLE 1A

| Properties of the Amalgam material according to the manufacturer's datasheet. | |
| --- | --- |
| Code | Amalgam |
| Commercial name | Permite capsules[+, ‡] |
| | (non-gamma 2 admix spherical alloy) |
| Composition by weight | Silver (56%), Tin (27.9%), Copper (15.4%), Indium (0.5%), Zinc (0.2%) and Mercury (47.9%) |
| Fabricant | Lathe cut |
| Reorder/Lot code | 4022303/1605055 |

[+]Regular set, 600 mg alloy, and 552 mg mercury.

[‡]SDI Limited, Bayswater, Victoria, Australia.

TABLE 1B

| Properties of the Composite resin materials used according to the manufacturer's datasheet. | | |
|---|---|---|
| Code | LV_composite | HV_composite |
| Commercial name | TPH Spectra Universal Composite Restorative**(Low Viscosity) | TPH Spectra Universal Composite Restorative**(High Viscosity) |
| Matrix/Fillers | Bis-GMA resin; TEGDMA; Polymerizable Dimethacrylate Resin; CQ photoinitiator; Ethyl-4(dimethylamino)benzoate photo accelerator; BHT; UV stabilizer; Silanated bariumalumino-borosilicate glass; Silanated barium-boron-fluoro-alumino-silicate glass; Silicon dioxide; Fluorescent agent; Synthetic Inorganic Iron oxide pigments, and Titanium dioxide. | Bis-GMA resin; TEGDMA; Polymerizable Dimethacrylate Resin; CQ photoinitiator; Ethyl-4(dimethylamino)benzoate photo accelerator; BHT; UV stabilizer; Silanated bariumalumino-borosilicate glass; Silanated barium-boron-fluoro-alumino-silicate glass; Silicon dioxide; Fluorescent agent; Synthetic Inorganic Iron oxide pigments, and Titanium dioxide. |
| Filler[+, §] | 75.5%, ~15 μm | 77.2%, ~15 μm |
| LOT/colour | 170328/A2 | 171200711/A2 |

[+]Weight %,

[§]Size of fillers

**DENTSPLY International

CQ, Camphor quinone;

BHT, Butylated hydroxytoluene;

Bis-GMA, bisphenyl A glycidyl methacrylate;

TEGMA, tri-ethylene-glycol-dimethacrylate

TABLE 2A

| Intra-class Correlation Coefficient of SP and OCT measuring methods | | |
|---|---|---|
| Intra-class Correlation | 95% CI Lower Bound | 95% CI Upper Bound |
| 0.99 | 0.979 | 0.995 |

TABLE 2B

| Descriptive statistics of SP Vs OCT measuring methods | | | | |
|---|---|---|---|---|
| | N | Mean | Std. Deviation | Std. Error of the Mean |
| SP measurements | 30 | 69.81 | 11.74 | 2.14 |
| OCT measurements | 30 | 63.77 | 11.94 | 2.18 |

TABLE 2C

| Significance of difference between means for SP and OCT measuring methods | | | |
|---|---|---|---|
| | t statistic | DoF | Prob > \|t\| |
| Equal Variance Assumed | −1.97 | 58.00 | 0.05315 |
| Equal Variance NOT Assumed | −1.97 | 57.98 | 0.05315 |

TABLE 3A

| Descriptive statistics of the average wear rates of the three restorative materials | | | | | | |
|---|---|---|---|---|---|---|
| | | | | | 95% Confidence Interval for Mean | |
| Material | N | Mean (μm) | Std. Deviation | Std. Error | Lower Bound | Upper Bound |
| Amalgam | 30 | 63.77 | 11.94 | 2.18 | 59.31 | 68.23 |
| LV_Composite | 30 | 22.61 | 12.21 | 2.23 | 18.05 | 27.17 |
| HV_Composite | 30 | 21.13 | 10.48 | 1.91 | 17.21 | 25.04 |

TABLE 3B

| ANOVA result of the average wear rates in the restorative materials | | | | | |
|---|---|---|---|---|---|
| | Sum of Squares | DoF | Mean Square | F-Value | P-Value |
| Between Groups | 35146.026 | 2 | 17573.01 | 131.28 | <0.001 |
| Within Groups | 11646.046 | 87 | 133.86 | | |
| Total | 46792.072 | 89 | | | |

TABLE 3C

| | | | | | 95% Confidence Interval | |
|---|---|---|---|---|---|---|
| Material (I) | Material (J) | Mean Difference (I − J) | Std. Error | P-Value | Lower Bound | Upper Bound |
| Amalgam | LV_Composite | 41.16* | 2.99 | <0.001 | 34.04 | 48.29 |
| | HV_Composite | 42.64* | 2.99 | <0.001 | 35.52 | 49.76 |
| LV_Composite | Amalgam | −41.16* | 2.99 | <0.001 | −48.29 | −34.04 |
| | HV_Composite | 1.48 | 2.99 | 0.874 | −5.65 | 8.60 |
| HV_Composite | Amalgam | −42.64* | 2.99 | <0.001 | −49.76 | −35.52 |
| | LV_Composite | −1.48 | 2.99 | 0.874 | −8.60 | 5.65 |

Multiple comparisons of the average wear rates in the restorative materials using the Tukey HSD test

*The mean difference is significant at the 0.05 level.

The invention claimed is:

1. A method of calibrating an apparatus configured to perform optical coherence tomography to measure depth of an article of a prescribed type, the method comprising the steps of:

a) using an existing measurement system comprising a surface profiler configured to measure depth, measuring a sample of the article of the prescribed type to obtain reference depth measurements, wherein measuring the sample comprises performing a plurality of measurements at different positions on the sample, wherein each measurement is in the form of a profile of the sample at a corresponding one of the positions thereon;

b) using the apparatus configured to perform optical coherence tomography, capturing sectional images of the sample at the same positions at which the reference depth measurements were obtained;

c) determining, in each sectional image of the sample captured by the apparatus configured to perform optical coherence tomography, a number of pixels in a depth direction of the sample; and d) determining, using the reference depth measurements and the numbers of pixels in the depth direction in the sectional images captured by optical coherence tomography, a correlation curve to associate pixels in images captured by optical coherence tomography with physical depth.

2. The method of claim 1 further including, after measuring the sample to obtain reference depth measurements, selecting, from the reference depth measurements, respective extreme values as representative measurements for the different positions, and wherein determining, in each sectional image of the sample captured by the apparatus configured to perform optical coherence tomography, a number of pixels in a depth direction of the sample comprises determining the number of pixels at a location of the sample corresponding to an extreme depth.

3. The method of claim 2 wherein the extreme values in the reference depth measurements are maximum depths, and the number of pixels determined at a location of the sample corresponding to an extreme depth are the number of pixels corresponding to a maximum depth of the sample.

4. The method of claim 1 further including, before determining a correlation curve, performing image registration to verify accuracy between the reference depth measurements obtained and the sectional images of the sample captured by optical coherence tomography, wherein image registration includes forming three-dimensional models of the sample representative of the existing measurement system and optical coherence tomography, respectively, and comparing images derived from the respective three-dimensional models, wherein the three-dimensional models representative of the existing measurement system and optical coherence tomography are formed based on the reference depth measurements and the sectional images, respectively.

5. The method of claim 4 further including repeating steps a) and b) if accuracy of the three-dimensional models of the sample representative of the existing measurement system and optical coherence tomography is below a prescribed threshold.

6. The method of claim 5 wherein the prescribed threshold is 90%.

7. The method of claim 1 wherein, when the article of the prescribed type is a tooth made substantially of a restorative material such that the tooth is homogeneous, the method further comprises, before measuring a sample of the article of the prescribed type to obtain reference depth measurements, forming the sample, including:

(i) providing a body of the restorative material;
(ii) forming a flat upwardly-facing surface on the body of restorative material; and
(iii) repeatedly striking the body of the restorative material on the upwardly-facing surface thereof over a prescribed period of time to mimic tooth wear.

8. The method of claim 1 wherein measuring a sample of the article of the prescribed type to obtain reference depth measurements comprises performing 10 or more measurements at different positions on the sample.

9. The method of claim 1 wherein, when the article of the prescribed type is a tooth, the existing measurement system has a resolution in the order of microns.

10. A measurement apparatus comprising:

an optical coherence tomography apparatus configured to perform optical coherence tomography to measure depth of a homogeneous body;

wherein the optical coherence tomography apparatus is calibrated according to the method of claim 1.

11. The measurement apparatus according to claim 10 wherein the optical coherence tomography apparatus has been further calibrated by, after measuring the sample to obtain reference depth measurements, selecting, from the reference depth measurements, respective extreme values as representative measurements for the different positions, and by determining, in each sectional image of the sample captured by the apparatus configured to perform optical coherence tomography, a number of pixels in a depth direction of the sample comprises determining the number of pixels at a location of the sample corresponding to an extreme depth.

12. The measurement apparatus according to claim 11 wherein the optical coherence tomography apparatus has been further calibrated such that the extreme values in the reference depth measurements are maximum depths, and the number of pixels determined at a location of the sample corresponding to an extreme depth are the number of pixels corresponding to a maximum depth of the sample.

13. The measurement apparatus according to claim 10 wherein the optical coherence tomography apparatus has been further calibrated by, before determining a correlation curve, performing image registration to verify accuracy between the reference depth measurements obtained and the sectional images of the sample captured by optical coherence tomography, wherein image registration includes forming three-dimensional models of the sample representative of the existing measurement system and optical coherence tomography, respectively, and comparing images derived from the respective three-dimensional models, wherein the three-dimensional models representative of the existing measurement system and optical coherence tomography are formed based on the reference depth measurements and the sectional images, respectively.

14. The measurement apparatus according to claim 13 wherein the optical coherence tomography apparatus has been further calibrated by repeating steps a) and b) if accuracy of the three-dimensional models of the sample representative of the existing measurement system and optical coherence tomography is below a prescribed threshold.

15. The measurement apparatus according to claim 14 wherein the prescribed threshold is 90%.

16. The measurement apparatus according to claim 10 wherein the optical coherence tomography apparatus has been further calibrated such that measuring a sample of the article of the prescribed type to obtain reference depth measurements comprises performing 10 or more measurements at different positions on the sample.

17. The measurement apparatus according to claim 10 wherein when the article of the prescribed type is a tooth, the existing measurement system has a resolution in the order of microns.

18. A method of measuring a dimension of an article comprising:

provide an apparatus configured to perform optical coherence tomography which has been calibrated according to the method of claim 1;

capturing, using said apparatus, an image of the article; and determining, from the image of the article, the dimension based on a number of pixels in the image in a corresponding direction of measurement.

* * * * *